United States Patent [19]
Cantamessa

[11] 3,784,723
[45] Jan. 8, 1974

[54] SPACING MEMBER FOR WIRE GROUPS IN ELECTRICAL OVERHEAD LINES

[76] Inventor: Lorenzo Cantamessa, via del Tonale e della Mendola 58, Endine, Italy

[22] Filed: May 23, 1973

[21] Appl. No.: 363,014

[30] Foreign Application Priority Data
Aug. 3, 1972 Italy .................................. 2943/72

[52] U.S. Cl. .................................. 174/42, 174/146
[51] Int. Cl. ......................... H02g 7/14, H02g 7/12
[58] Field of Search ............... 174/42, 146; D8/230; 188/1 B

[56] References Cited
FOREIGN PATENTS OR APPLICATIONS
978,167  12/1964  Great Britain ..................... 174/146
1,098,813  1/1968  Great Britain ..................... 174/146

*Primary Examiner*—Laramie E. Askin
*Attorney*—Richard P. Alberi

[57] ABSTRACT

Spacing member for wire group in electrical overhead lines capable of ensuring a constant rate of damp for the vibrations of wires connected thereto. The spacing member includes a central body to which a plurality of anchoring clips for the electrical wires are connected. The connection between the clips and central body is provided by movable arms rockingly carried on pins of ovoidal cross-section with the interposition of cores made of resilient material.

4 Claims, 8 Drawing Figures

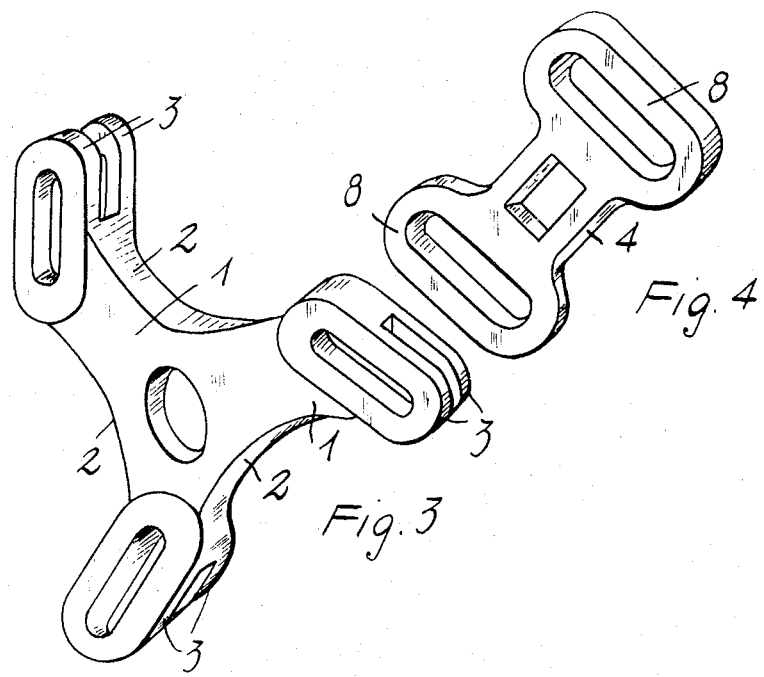
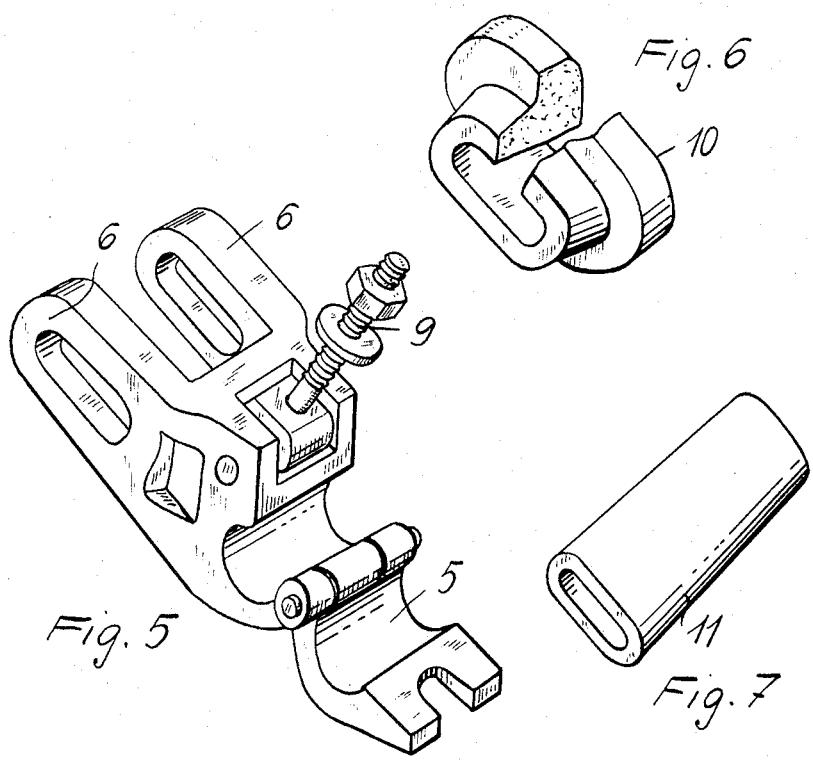

SPACING MEMBER FOR WIRE GROUPS IN ELECTRICAL OVERHEAD LINES

This invention relates to a spacing member for wire groups in electrical overhead lines provided with a high damp rate of the wire vibrations.

As well known, in electrical overhead lines and particularly high voltage lines, for a same phase use is made of multiple wires which must be spaced apart from one another in order to be prevented, for example, from overlapping under the wind action, and also to avoid the possibility of being subjected to damages by rubbing against one another. In the prior art, such spacing devices are used to this end as comprising a central body carrying on its periphery a plurality of arms having an articulated clamping clip or jaw for each of the wires in the group. In such known spacing devices, the articulation takes place on an arm pivoted at a location with the capability of describing only an arc of a circle. Accordingly, the damping system operates only through wire movements along this arc of a circle, which is not sufficient since each of the wires under the wind action are subjected in the space to a so-called "galloping" movement, sometimes following patterns according to looped orbits, generally of the elliptical type. As a result, the prior art spacing devices behave at the limits of the excursion arc thereof as a system having such a rigidity as to transmit such a galloping to the next section in the span, which could also cause damages to each of the wires, or the clip could yield when loaded at the limits of its excursion. Moreover, in the prior art devices, the articulation takes place on a cylindrical pin, about which a rotation is effected under the cable bias with a substantially very low or quite inexistent damp.

It is also well known that in order to provide a good vibration damping, the proper frequency of the system should be very low; particularly, it should be less than or at the most equal to 1 : 1.41 the disturbance frequency. In some of the prior art damping systems, this proper frequency is at the top limit of the above mentioned range, which is prejudicial to the damp capability.

This invention aims to provide a spacing member for wire groups in electrical overhead lines, which is of a simple and inexpensive construction and easy assembling, and, in addition to keeping the individual wires in each group spaced apart, ensures a constant rate in vibration damping of the wires throughout the potential excursion range thereof.

According to the invention, this is achieved by a spacing member for wire groups in electrical overhead lines, comprising a central bearing body carrying a plurality of arms, one arm for each wire, spaced apart on the periphery of said body and having the end thereof in the form of a fork, wherein the two legs of the fork are passed through by a respective hole of a cross-section other than circular, preferably elliptical, characterized in that each of said arms fast with the central body are associated with a respective movable arm carrying at each end a large eye with a hole of a cross-section other than circular, preferably elliptical, by one of its ends this movable arm being pivoted at the fork-like end of the associated rigid arm of the central body by a pin of a cross-section other than circular, particularly elliptical, and with the interposition of two cores made of resilient material, these cores being hollow and passed through by said pin, while the other end of the movable arm with the other large eye thereof similarly by a similar pin of a cross-section other than circular, preferably elliptical, similarly passing through two internally hollow cores of resilient material, is pivoted on the fork-like end of a jaw intended for clamping a respective wire.

Another feature of the spacing member according to the present invention is that said dampening cores of resilient material comprise an internally hollow body outwardly carrying an annular ridge and a truncated cone extension leading from the plane of the annular ridge and tapering in the direction of the longitudinal axis of the core, while the inner hole, of a cross-section other than circular and preferably elliptical, is tapering as a truncated cone in the opposite direction, with the major base at the plane comprising the minor base of the truncated cone of said extension.

An advantage of the spacing member according to the invention is that the pivoting system can follow the movement of the wires throughout the excursion thereof, that is along looped orbits, thereby ensuring a damp effect for any of the positions taken by the wire.

Another advantage of the spacing member according to the invention is that, due to the profile for the cores of resilient material, the system resistance does not follow a straight pattern, but is established by an elbow bend, so that as the stress exerted by the cable increases, also the resistance provided by the system according to the invention increases, whereby the vibration damping is always ensured.

These and further objects, features, details and advantages of the device according to the present invention will become more apparent to those skilled in the art on the ground of the following brief detailed description of an embodiment given by mere way of not limiting example, when considered in connection with the following drawings, in which:

FIG. 3 is a perspective view showing the central body of the spacing member;

FIG. 4 is a perspective view showing the movable arm associated with each of the arms integral with the central body;

FIG. 5 is a perspective view showing the clamping jaw at open position;

FIG. 6 is a perspective, partially sectional view showing a damp core of resilient material;

FIG. 7 shows a pivot pin of elliptical cross-section for use with the present invention.

Figure 1:
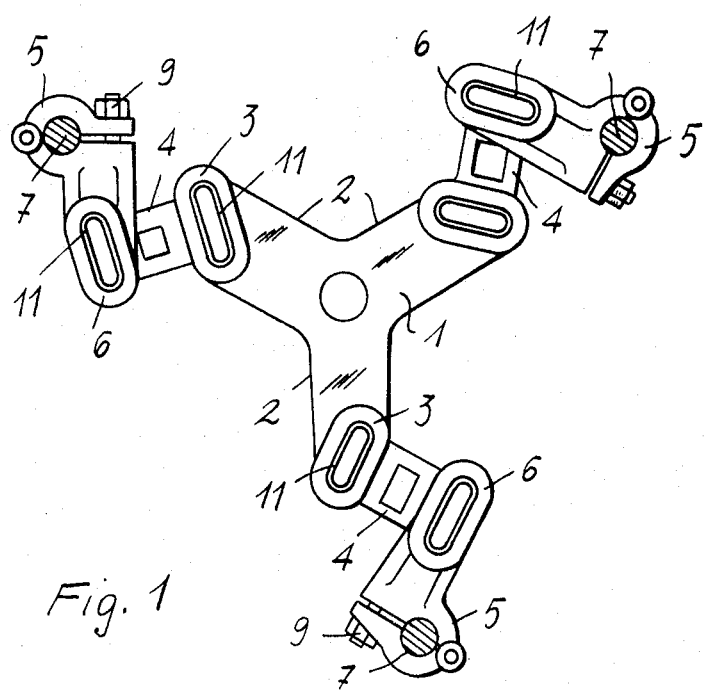
FIG. 1 is a plan view showing a spacing member according to the invention as applied to a three-strand wire group.
Figure 2:
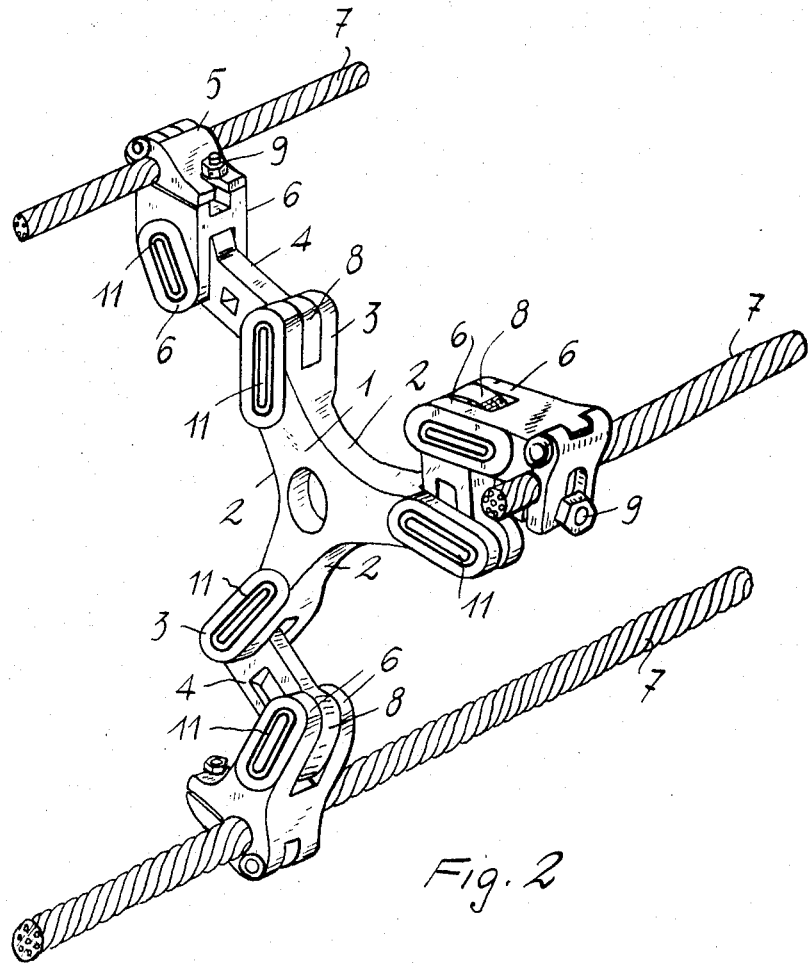
FIG. 2 is a perspective of the device shown in FIG. 1.

Referring now to the accompanying drawings, and particularly to FIGS. 1 and 2, it will be seen that the spacing device according to the invention comprises a central body 1, on its periphery carrying a plurality of equally spaced apart arms 2 integral with body 1. In the particular example shown in the drawing, such arms 2 are three in number, since the device is shown as connected with a three-strand wire group, however it being obviously usable for any amount of wires. As best shown in FIG. 3, each arm 2 has at its end a fork 3, the legs of which are passed through by a respective hole other than circular, preferably elliptical. At the end of each arm 2 there is pivoted on fork 3 one end of a movable arm 4, the two ends of which are both formed with a large eye 8 having a bore other than circular, preferably elliptical. The other end of the movable arm 4 having another large eye 8 is similarly pivoted to the fork 6 of a clamping bracket 5, best shown in FIG. 5. Since the pivoting and clamping system is the same for each individual wire 7, it will now be described in connection with only one wire, whereby the reference numerals, for example in FIG. 2, are shown as related to only one side for an individual wire 7. Since also the links between arm 4 and arm 2 and between arm 4 and fork 6 of jaw 5 are the same, the structure will now be described for only one link.

Figure 8:
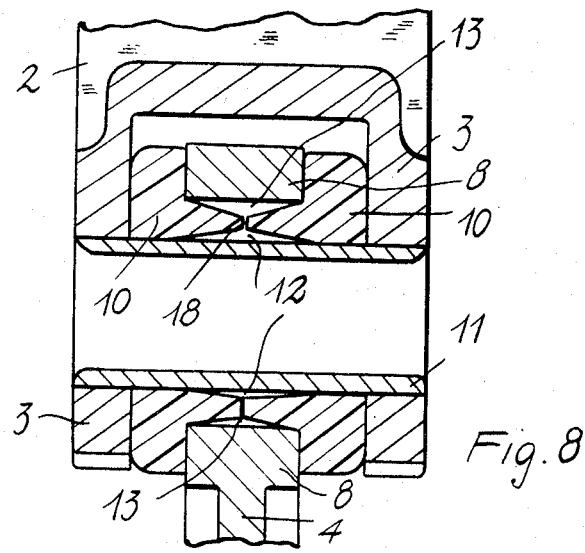
FIG. 8 is a sectional view showing a pivot or link provided with pin and damping cores according to the invention.

Particularly referring to FIG. 2 and to the sectional view in FIG. 8, it will be seen that the link is made by inserting from each side in the bore of large eye 8 in arm 4 a damping internally hollow core 10 made of resilient material, such as rubber, as best shown in FIG. 6. The large eye 8 of arm 4, along with the two cores 10 thus inserted, is then placed within said fork 3, and then the ovoidal pin 11 (FIG. 7) is inserted, so as to pass through the ovoidal eyes of the fork, as well as the inner ovoidal bore of each core 10, thereby securing the assembly in position. The other links in the spacing member are similarly made. As shown in FIGS. 6 and 8, each of the cores 10 has an annular ridge abutting against the side wall of the large eye 8, whereas that portion which is inserted in the bore of the large eye is conically flared as a truncated cone both on the outer periphery and on the inner contour, the two conical flares being oppositely formed, so that the minor base of the outer truncated cone will lie in the plane of the major base of the inner truncated cone at the centre of the large eye 8. Accordingly, at the unstressed position of cores 10, there will be a free annular space between the outer surface of pin 11 and the inner surface of cores 10, this space being shown at 12 in FIG. 8, as well as a free space 13 between the outer surface for the cones of cores 10 and the inner surface of large eye 8.

Hence, when the device is positioned, and wire 7 has been tightened in jaw 5 by means of bolt and nut 9, the assembly comprising body 1 and arms 4 and the latter and jaw 5 has a double link not only capable of following the wire movement in the space according to possible looped orbits, and thus operating to provide a damp at any of the positions taken by the wire in its orbital movement, but which, due to the particular configuration as a double cone of said damping cores 10, will also provide the wire movement with a braking effect which is progressively increasing according to an elbow bend as the bias exerted by wire 7 increases. This results in that at the spaces 12 and 13 there is always a larger contact surface between rubber and metal of the spacing member as the stress increases, as a consequence of the particular configuration of the pin and eyes preventing a rotation about the longitudinal axis. Moreover, the provision of two damping cores, in addition to the advantage of a higher damping capability, provides also the advantage of having a low proper oscillation frequency, which for the spacing member according to the invention is about 0.4 Hz, which as above stated promotes the oscillation damp. In the system the end of stroke is resiliently accomplished and given by the shape of the damping cores.

Although the spacing member has been described in connection with a group of three strand wires, it is apparent that by correspondingly varying the number of arms, such a spacing member is applicable to groups having any amount of wires. Moreover, although an elliptical shape has been described for for the damping core, pin and eyes, a same effectiveness can be achieved by using also a rectangular shape, or any geometrical shape capable of preventing a complete revolution.

What I claim is:

1. A spacing member for wire groups in electrical overhead lines, comprising a central bearing body carrying a plurality of arms, one arm for each wire, equally spaced apart on the periphery of said body and having the end thereof in the form of a fork, wherein the two legs of the fork are passed through by a respective hole of a cross-section other than circular, wherein each of said arms integral with the central body are associated with a respective movable arm carrying at each end a large eye with a bore of a cross-section other than circular, by one of its ends this movable arm being pivoted at the fork-like end of the associated rigid arm of the central body by a pin of a cross-section other than circular, and with the interposition of two cores made of resilient material, these cores being internally hollow and passed through by said pin, while the other end of the movable arm with the other, large eye thereof similarly by a similar pin of a cross-section other than circular similarly passing through two internally hollow cores of resilient material, is pivoted on the fork-like end of a jaw intended for clamping a respective wire.

2. A spacing member as claimed in claim 1, wherein said cores of resilient material comprise an internally hollow body outwardly carrying an annular ridge and a truncated cone extension leading from the plane of the annular ridge and tapering in the direction of the longitudinal axis of said core, whereas the internal bore of a cross-section other than circular is tapering as a truncated cone in the opposite direction, with the major base at the plane comprising the minor base for the truncated cone of said extension.

3. A spacing member as claimed in claim 2, wherein said cores are arranged in each link so that the extension thereof inserts in the large eye of the movable arm, while the annular ridge abuts against the respective side wall of the large eye and bears on the inner surface of the fork, wherein the large eye is inserted.

4. A spacing member as claimed in claim 3, wherein in each articulation of said spacing member, between the outer surface of the pin passing through the pair of cores and the inner surface of the bore in said cores, as well as between the outer surface of the core extensions and the inner surface of the large eye in each of the movable arms, an annular space is provided and progressively decreases as the stress exerted by the respective wire increases.

* * * * *